Dec. 7, 1965   P. SCHMUCK   3,222,007
APPARATUS FOR OPERATING CAMERAS IN WHICH COMPONENT STRIPS
OF A FILM ARE EXPOSED IN SUCCESSION
Filed Jan. 19, 1962   3 Sheets-Sheet 1

Inventor:
Peter Schmuck

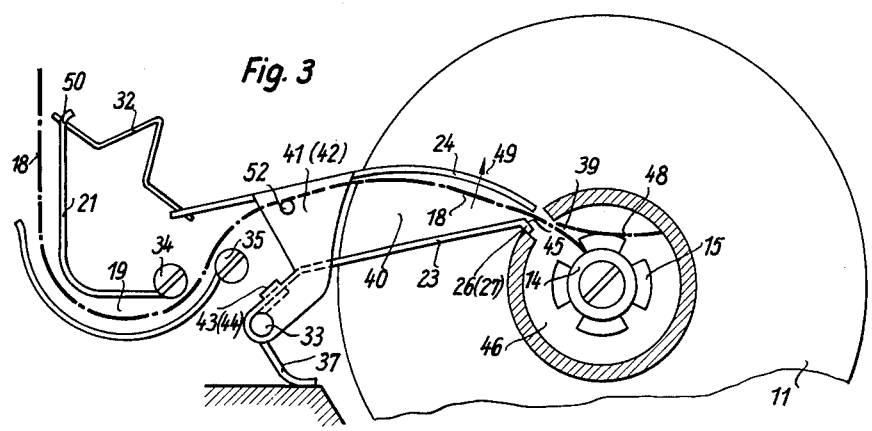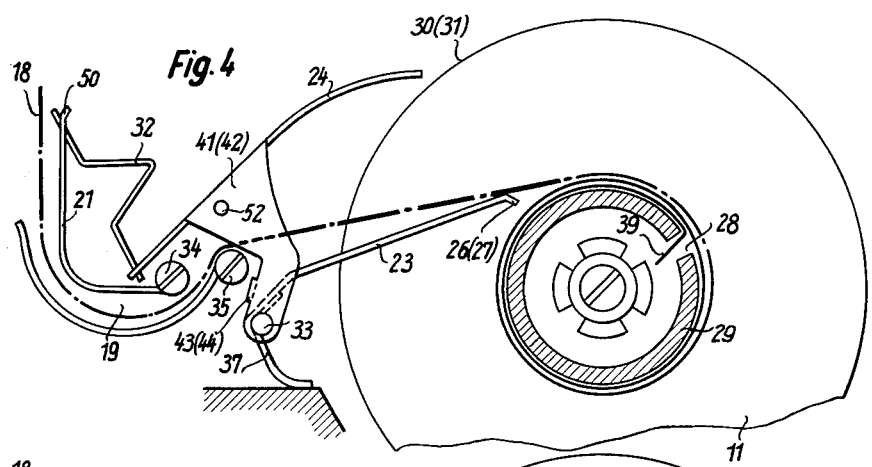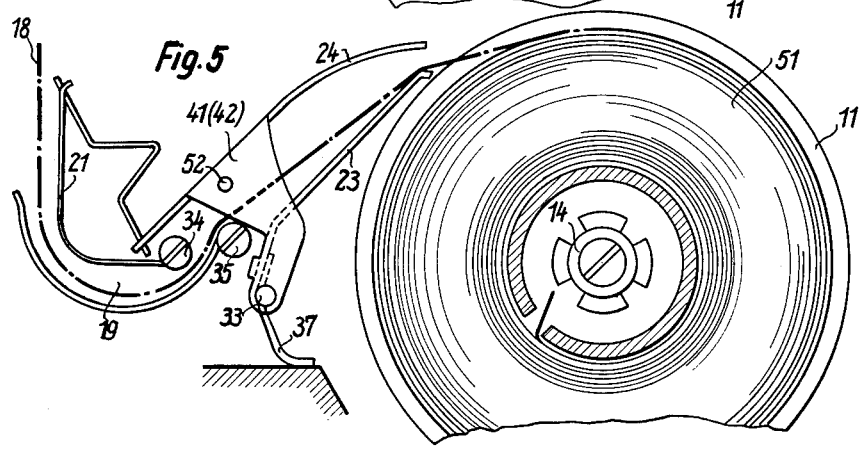

Dec. 7, 1965 P. SCHMUCK 3,222,007
APPARATUS FOR OPERATING CAMERAS IN WHICH COMPONENT STRIPS
OF A FILM ARE EXPOSED IN SUCCESSION
Filed Jan. 19, 1962

Inventor:
Peter Schmuck

United States Patent Office 3,222,007
Patented Dec. 7, 1965

3,222,007
APPARATUS FOR OPERATING CAMERAS IN WHICH COMPONENT STRIPS OF A FILM ARE EXPOSED IN SUCCESSION
Peter Schmuck, Mauren, Liechtenstein, assignor, by mesne assignments, to Keystone Camera Company, Inc., Boston, Mass., a corporation of Massachusetts
Filed Jan. 19, 1962, Ser. No. 167,319
15 Claims. (Cl. 242—71)

The method proposed according to the invention for the operation of cameras in which component strips of a film are exposed in succession, is characterized in that during the exposure of the first component strip the leading end of the film and during the exposure of the second component strip the trailing end of the film are automatically connected to the take-up and supply spools, respectively. The term take-up spool denotes a spool having the sole purpose so to take up the film during the exposure of the first component strip that the second component strip can be exposed when the spools have been interchanged to move the take-up spool to the position formerly occupied by the supply spool for the film whereas the supply spool assumes the position formerly occupied by the take-up spool. When the film is exposed after the spools have been interchanged, the optical axis will intersect the center line of the second component strip of the film during its intermittent movement so that the pictures thus obtained succeed in true order with respect to position, perforations and image formation.

In a development of the method, consideration must be given to the fact that cameras are generally provided with spools which have a slotted hub tube for locating the film. In this case, a development of the method according to the invention is characterized in that during the insertion of the film that spool which serves for taking up the film is arrested in that position in which the end face of the film faces the slot, that the film bulges as it is fed by feed claws and the leading end of the film is stopped while the spool is arrested, and that the spool is released for rotation by the bulging film. When the film has thus been threaded, the further movement of the film is effected by the frictionally driven spool.

In cameras in which the chamber accommodating the spools has a shutter, as usual, to enable a light tight accommodation of the spools, and which are provided with a movable threading device according to the invention, the method may be modified in that the threading device can be moved to its threading position in automatic dependence on said shutter for the chamber for accommodating the spools. Conversely, the complete film roll may be used to move the threading device into its initial position in which it does not interfere with the axial withdrawal of the completely wound spool and the fitting of a new spool designed to take up the film.

Apparatus for carrying out the process may be designed in various ways. They are preferably characterized by the provision of a movable threading device having two basic positions, in one of which the device is disposed outside the spool so that the same can be positioned by fitting it axially on its bearing shaft or can be withdrawn from the latter, whereas in the other position the device is disposed in the space between the spool flanges, the device having a supporting guide engaging the slot of the hub and a covering guide which extends arcuately toward the film and is combined with a tilting spring arrangement, which positively holds the threading device in one basic position or the other. Various embodiments are possible, the first of which resides in that, e.g., the supporting and covering guides are rigidly interconnected. Another possibility resides in that the supporting guide is movable and spring-cushioned relative to the covering guide so that the supporting guide tends to approach the covering guide, a stop being provided to maintain the minimum spacing required for moving the film through the space between both guides and the spring force of the tilting spring exceeding that of the supporting guide spring. It is thus ensured that under the predominant spring force of the tilting spring the supporting guide remains constantly urged against the hub tube of the spool so that an interengagement results whereby the movement of the spool is temporarily arrested until the bulging film acts on the covering guide with a force which overcomes the opposing action of the tilting spring so that the supporting guide is carried along and moved out of the interengaged position by the now beginning movement of the covering guide and the spool is released for its movement to wind up the film.

In both cases an actuating pin for moving the threading device to its basic positions may be provided. A cam face of the actuating pin is preferably arranged to move the threading device automatically to a basic position in dependence on the respective position of other camera parts, e.g., in dependence on the position of the cover slide or the like serving for closing the chamber for accommodating the spools.

Stationary guiding and directing walls, preferably in the form of guiding and directing sheet metal elements, are suitably arranged before the supporting and covering guides of the threading device and bridge the space between the stationary film guide (film pressure plate) and the threading device.

The tilting spring consists suitably of a bail-shaped spring in order to enable the relatively large deflection of the spring which is required.

If that portion of the supporting guide which serves for engaging the slot in the hub tube consists of lugs which engage the film outside of the perforations thereof, it is ensured that in addition to the arresting of the spool the image-receiving portion of the film remains entirely free of mechanical influence so that a formation of scratches or other influences which interfere with the reproduction of the image on the rear side is also avoided whereas the supporting guide does not engage the emulsion side of the film.

Two illustrative embodiments of the film are shown on the drawing.

FIG. 3 shows another embodiment of the threading device in a position in which the interengagement and the stopping of the spool to prevent its rotation have just been effected.

FIG. 4 shows the device illustrated in FIG. 3 in a somewhat later phase, in which the winding of the film has already begun.

FIG. 5 shows the device illustrated in FIGS. 3 and 4 in the position in which the film roll has been completely wound so that it is sufficient to withdraw the spool either to interchange the spools or to remove the entirely exposed film from the camera.

Figure 1:
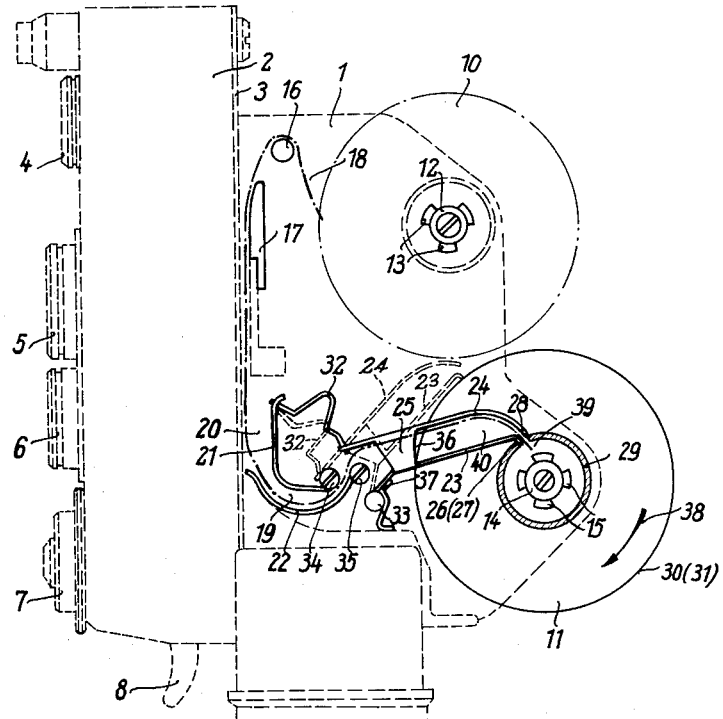
FIG. 1 is a side elevation in which the essential parts of a camera embodying the invention are indicated by dotted lines and the threading device is shown just in that position in which the interengagement and threading of the film are effected.
Figure 2:
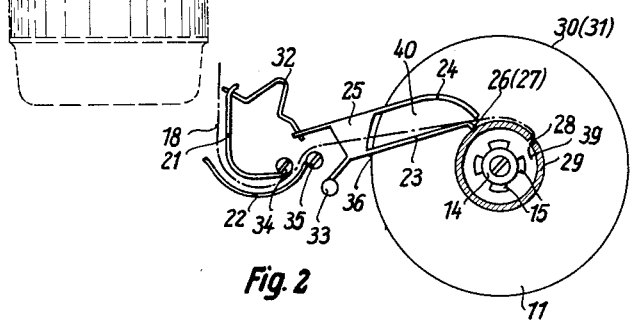
FIG. 2 shows the embodiment of FIG. 1 in the position in which the threading device has already been released and the winding of the film on the spool has begun.

In FIG. 1, 1 is the bearing plate of the camera body, the front portion 2 of which is provided with the viewfinder 3, the cover plate 4 for the battery of the photoelectrical diaphragm setting means, the lens 5, the light entrance 6 for the diaphragm control means, the setting elements 7 and the release 8. The drive means for the feed mechanism of the camera serving to rotate the spools is accommodated in the handle 9. The supply spool is indicated at 10, the take-up spool at 11. The supply spool 10 is fitted on the shaft 12, which carries leaf springs 13 for holding the fitted spool in position. The same parts are provided at 14 and 15 on the take-up spool 11. The drawing shows also the film guide 16, the film pressure plate 17 and the film 18 itself, which is indicated by a dash and dot line to distinguish it from the camera parts. It is apparent that having passed over the film pressure plate 17, the film 18 can enter a duct 19, which is enlarged at 20 in trumpet shape and is bounded by the guiding and directing sheet metal elements 21, 22. The guiding and directing sheet metal elements 21, 22 are followed by the threading device according to the invention. It comprises essentially a supporting guide 23 and a covering guide 24, which are rigidly connected by a part 25. As is particularly apparent from FIG. 7, the supporting guide 23 has two projecting lugs 26, 27, which are intended to snap into the slot 28 of the hub tube 29 of the take-up spool 11 formed with flanges 30, 31. For this purpose, the tilting spring 32 is provided, one end of which is suitably hinged to the directing and guiding sheet metal element 21 whereas the other end bears on the covering guide 24. FIG. 2 shows more clearly that the entire threading device is rotatable about a pin 33 and that film directing pins 34, 35 locate the directing and guiding sheet metal elements 21, 22 in position and enable an exact adjustment thereof. A stop 36 of the threading device engages the rim of the flanges 30, 31 to limit an inward pivotal movement of the threading device beyond the position shown in FIG. 1. The supporting guide 23 is engaged by a spring 37, which tends to rotate the supporting guide and with it the entire threading device about the pin 33 in the counterclockwise sense. This is prevented by the bail-shaped spring 32, whose opposing spring forces are stronger than those of the spring 37 unless manual or displacing forces are exerted which exceed the forces of the spring 32.

The mode of operation of the described device is as follows:

After the film pressure plate 17 has been opened, the operator need only insert the film 18. The supply spool 10 is fully wound, the take-up spool 11 is empty. Operation of the trigger 8 releases the feed mechanism of the camera so that the intermittent feed movement of the film 18 by the feed claw, not shown, begins. When the film pressure plate 17 was moved to its effective position, the feed claw was caused to enter the perforations of the film 18 and is thus capable of effecting said intermittent feed movement. This causes the leading end 39 of the film to enter the trumpet-shaped duct 20 and then the duct 19. In the meantime, the film spool 11 has been rotated by its friction drive. As the slot 28 of the hub 29 is probably not just in registry with the locking lugs 26, 27 of the supporting guide 23 when the spool 11 is inserted, the latter is rotated first to move the slot 28 reliably in registry with the locking lugs 26, 27. As the opposing action of the spring 37 is overcome by the spring 32, the locking lugs 26, 27 will then fall into the slot 28. This causes first a stoppage of the further rotation of the spool 11 because the interengagement at 26, 27 overcomes the frictional forces tending to drive the spool. The feed movement of the film 18 by the feed claws is continued so that with the assistance of the guiding action of the covering guide 24, the leading end 39 of the film enters the slot 28. As will be explained in more detail with reference to FIG. 3, the leading end of the film may be stopped in various ways. Irrespective of how this stoppage is effected, the leading end of the film bulges so that the bulged film exerts an upwardly directed force on the covering guide 24. As the parts 24, 23 are rigidly connected at 25, the locking lugs 26, 27 are pulled out of the slot 28. This releases the spool 11 for rotation. As soon as the actuation of the trigger 8 for a sufficiently long time has caused the leader of the film to be wound up on the hub core 29 of the spool 11, the camera has been made ready for shooting. The roll of film being formed urges the supporting guide 23 into the position shown in dotted lines in FIG. 1 because when the spool is fully wound, the trailing end of the film will be approximately flush with the rim of the flanges 30, 31. The movement of the film out of the threading device does not involve any difficulty at all. When the first component strip has been exposed, the take-up spool 11 may be removed simply by axially withdrawing it from the bearing shaft 14, whereafter the spool 11 is turned and fitted on the shaft 12, after the empty supply spool 10 has been withdrawn and fitted on the shaft 14. The film 18 exposed on its first component strip is re-inserted while the film pressure plate 17 is open. For the exposure of the second component strip, the threading operations are performed as has already been described in connection with the winding of the film on the take-up spool 11.

In FIGS. 3–5, like reference characters denote like parts. The only difference resides in the absence of a connecting part 25 between the covering guide 24 and the supporting guide 23. The covering guide 24 is rotatably mounted on the pin 33 by means of the side plates 41, 42. As is more clearly apparent from FIG. 6, the plates 41, 42 form stops 43, 44, which prevent an approach of the supporting guide 23 to the covering guide 24 under the influence of the spring 37 beyond the position shown in FIG. 3 so that a passage slot 45 at the end of the space 40 will always remain open and the insertion of the leading end 39 of the film into the cavity 46 of the hub is ensured when the lugs 26, 27 are in locking position. FIG. 3 shows that as required to cause the film 18 to bulge when its feeding by the feed claws is continued, the leading end 39 of the film is stopped either by engaging the shaft 14 or by becoming entangled with the springs 15 thereof or, as is indicated by dash and double dot lines at 48, by entering the space 46 between the hub tube 29 and the shaft 14 or springs 15, whereby the leading end 39 of the film is so kinked, as is shown in FIGS. 2 and 4, that its frictional engagement with the sharp edges of the slots 28 arrests the leading end 39 of the film. This causes the film to bulge in the direction of the arrow 49 so that the film 18 engages the covering guide 24. The latter is thus caused to perform a pivotal movement in the counterclockwise sense about the axis 33. This results in a corresponding movement of the stops 43, 44 so that the spring 37 causes the supporting guide 23 to follow and release the hub 29 and with it the entire spool 11 for rotation. Thus, the position of FIG. 4 is assumed after the position of the parts shown in FIG. 3. However, FIG. 4 differs from FIG. 2 in that owing to the separation of the parts 23, 24, the covering guide 24 has now been pivotally moved entirely out of the range of the flanges 30, 31. It is thus ensured that the bulging of the film in the direction 49 causes the tilting spring 32 to assume a position beyond the neutral position determined by the straight line connecting the points 50 and 33. Whereas in the position of the parts shown in FIG. 3, the tilting spring 32 is still above the straight line 50—33 and with respect to the axis of rotation 33 exerts a clockwise torque on the covering guide 24, the direction of the torque is now reversed so that in the position shown in FIG. 4, the tilting spring 32 exerts on the covering guide 24 a force which moves the covering guide 24 to the position shown in the drawing. Thus, it will be seen that the spring 32 is an over-center spring which acts in opposed directions depending upon which side of the line 50—33 the lower end of the spring 32, as viewed in FIGS. 3–5, is located.

The parts have assumed the position shown in FIG. 5 as soon as the roll of film 51 has been completely wound. At this time, the trailing end of the film constitutes the outermost turn of the roll 51 so that the fully wound spool 11 may be removed from the shaft 14 when the camera has been opened. When this is effected at a time when only the first component strip of the film has been exposed, the spools will be interchanged, followed by a second threading operation. After the exposure of the second component strip, the roll 51 has already been wound on the supply spool 10 and the completely exposed film can be removed from the camera.

Figure 6:
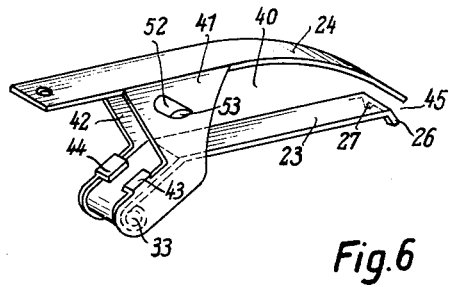
FIG. 6 is a perspective view showing the threading device illustrated in FIGS. 3–5 and FIG. 7 is a top plan view showing that end of a supporting guide which serves for interengaging with the hub tube of the spool.

FIG. 6 shows that the bearing plate 41 of the covering guide 24 carries a pin 52 having a cam face 53. This cam face may coact, e.g., with a corresponding cam face of the cover of the camera or a camera magazine to move the threading device to its position, e.g., as shown in FIG. 4. An appropriately designed stop of the cover co-operates with the cam face 53 to force the pin 52 and with it the bearing plates 41, 42 as well as the covering guide 24 into the position shown in FIG. 4. By a sudden release of interposed springs, this movement may be effected under the action of a strong impulse in such a manner that the tilting spring 32 is moved upwardly from a position like that of FIG. 3 beyond the neutral position 50—33 shown in FIG. 4. This causes the covering and supporting guides 24, 23 to assume the position shown there, in which the threading device is inoperative. On the other hand, the growing wound roll of film 51, ensures that the other basic or initial position will be automatically assumed.

In view of the nature of the invention, the same is not limited to the illustrative embodiments. For instance, the cam face 53 of the pin 52 may be shaped so that after the threading operation has been performed and when the camera or magazine cover is still open, some turns of the film are wound on the hub tube before the cover is closed. In this case, the arrangement of the pin 52 with the cam face 53 will be such that the threading device is swung out of the space between the spool flanges so that the movement of the threading device to its ineffective position does not depend on the cooperation of the roll of film. In such case the pin 52 serves only for manual adjustment. This means that the threading device is first moved to the threading position by a pivotal movement of the pin 52 whereas when the camera or magazine is closed, the cam face 53 becomes effective to move the pin 52 to a position in which the threading device is swung out of the space between the spool flanges.

Figure 7:
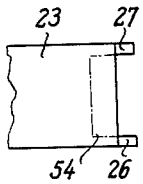

As is shown in FIG. 7, the supporting guide may have a cut-out portion as indicated by the dotted lines 54 in order to prevent damage to the film by the edge between the lugs 26, 27.

What is shown in the drawing for a camera in which the supply and take-up spools are accommodated in the camera housing is also applicable to a camera provided with a change magazine, which accommodates the supply and take-up spools. Cameras provided with such change magazines are disclosed, for example, in the U.S. Patent 1,969,484.

Regarding the connection of the spring-driven motor accommodated in the handle of the camera to the driving element of the feed mechanism of the camera, reference is made to the U.S. Patent No. 2,928,315.

What is claimed is:

1. In a camera, in combination, support means for supporting a take-up spool for rotary movement, said take-up spool having a hub formed with a slot through which a leading end of a film strip is adapted to pass to be attached to the spool and wound thereon; film guide means supported by said support means for free movement to and from a position where a free end of said guide means is aligned with said slot to direct the leading end of a film strip through said slot into said hub, said guide means having an elongated curved portion extending up to and including said free end thereof and presenting to a film strip which advances toward said hub a concave surface promoting in the film strip, when the leading end of the film strip encounters in the hub a surface preventing further movement of the film strip into the hub while the film continues to advance toward the hub, the formation of a bulge which increases in size during the continued advance of the film strip toward the hub and presses against said guide means to urge the latter away from said hub; directing means carried by said support means for directing the film strip, while it advances toward the hub, along a path which places the film strip in engagement with said concave surface of said guide means to slide therealong, so that the film strip will bulge between the slot of the hub and a surface portion of said guide means; and yieldable means urging said guide means toward said hub with a force which is too small to prevent movement of said guide means away from said hub as the bulge in the film strip increases in size and presses with an increasing force against said guide means, the space which is located at that side of said guide means which includes said concave surface being large enough to provide unobstructed formation of the film bulge which urges said guide means in opposition to said yieldable means away from said hub.

2. In a camera, in combination, support means for supporting a take-up spool for rotary movement, said take-up spool having a hub formed with a slot through which a leading end of a film strip is adapted to pass to be attached to the spool and wound thereon; film guide means supported by said support means for free movement to and from a position where a free end of said guide means is aligned with said slot to direct the leading end of a film strip through said slot into said hub, said guide means having an elongated portion distant from said free end thereof and a curved portion extending from said elongated portion to said free end and presenting to a film strip which advances toward said hub a concave surface promoting in the film strip, when the leading end of the film strip encounters in the hub a surface preventing further movement of the film strip into the hub while the film strip continues to advance toward the hub, the formation of a bulge which increases in size during the continued advance of the film strip toward the hub and presses against said guide means to urge the latter away from said hub; directing means carried by said support means for directing the film strip, while it advances toward the hub, along a path which places the film strip first in engagement with said elongated portion of said guide to slide therealong and then in engagement with said concave surface of said guide means, so that the film strip will bulge between the slot of the hub and the place where it first engages said elongated portion of said guide means; and yieldable means urging said guide means toward said hub with a force which is too small to prevent movement of said guide means away from said hub as the bulge in the film strip increases in size and presses with an increasing force against said guide means, the space which is located at that side of said guide means which includes said concave surface being large enough to provide unobstructed formation of the film bulge which urges the guide means in opposition to said yieldable means away from said hub.

3. In a camera, in combination, support means for supporting a take-up spool for rotary movement, said take-up spool having a hub formed with a slot through which a leading end of a film strip is adapted to pass to be attached to the spool and wound thereon; film guide means supported by said support means for free movement to and from a position where a free end of said guide means is aligned with said slot to direct the leading end of a film strip through said slot into said hub, said guide means having an elongated portion distant from said free end thereof and a curved portion extending from said elongated portion to said free end and presenting to a film strip which advances toward said hub a concave surface promoting in the film strip, when the leading end of the film strip encounters in the hub a surface preventing further movement of the film strip into the hub while the film strip continues to advance toward the hub, the formation of a bulge which increases in size during the continued advance of the film strip toward the hub and presses against said guide means to urge the latter away from said hub; directing means carried by said support means for directing the film strip, while it advances toward the hub, along a path which places the film strip first in engagement with said elongated portion of said guide to slide therealong and then in engagement with said concave surface of said guide means, so that the film strip will bulge between the slot of the hub and the place where it first engages said elongated portion of said guide means; yieldable means urging said guide means toward said hub with a force which is too small to prevent movement of said guide means away from said hub as the bulge in the film strip increases in size and presses with an increasing force against said guide means, the space which is located at that side of said guide means which includes said concave surface being large enough to provide unobstructed formation of the film bulge which urges said guide means in opposition to said yieldable means away from said hub; and holding means operatively connected to said guide means for holding said take-up spool stationary as long as said guide means is in said position where said free end thereof is aligned with said slot of said hub and for releasing said spool for movement when the film bulge displaces said guide means away from said hub.

4. In a camera as recited in claim 2, said yieldable means being an over-center spring means which positively moves said guide means away from said hub after said guide means has been moved through a predetermined distance away from said hub by the film bulge.

5. In a camera as recited in claim 3, said yieldable means being in the form of an over-center spring means which positively moves said guide means away from said hub after said guide means has been displaced from said hub by a predetermined distance by the film bulge; and spring means weaker than said over-center spring means operatively connected to said guide means for also urging the latter away from said hub.

6. In a camera as recited in claim 5, said guide means including a pair of elongated guide plates one of which has said elongated portion and said curved portion and the other of which is substantially straight and parallel to said elongated portion, said concave surface of said one guide plate being directed toward said other guide plate and said space being included between said guide plates, said holding means being in the form of a projection fixed to a free end of said other guide plate and extending into said slot and engaging said hub of said spool at one edge of said slot.

7. In a camera as recited in claim 2, said guide means including a pair of elongated guide plates one of which has said elongated portion and said curved portion and the other of which is spaced from said one plate and defines with the latter said space which is situated between said plates, said concave surface of said one plate being directed toward said other plate, and said plates being fixed to each other for movement as a unit relative to said support means.

8. In a camera as recited in claim 2, said guide means including a pair of guide plates one of which has said elongated portion and said curved portion and the other of which is spaced from said one plate and defines therewith said space which is situated between said plates, said concave surface of said one plate being directed toward said other plate and said plates being connected to each other for movement one relative to the other.

9. In a camera as recited in claim 8, stop means determining the relative positions of said plates relative to each other to limit the extent to which said free end of said one plate can approach said other plate so as to maintain between said free end of said one plate and said other plate a passage through which the film can advance into said hub.

10. In a camera as recited in claim 9, spring means acting on said plates for maintaining the latter in cooperation with said stop means in said limiting position where the space between said free end of said one plate and said other plate is maintained.

11. In a camera as recited in claim 2, said yieldable means being in the form of an over-center leaf spring which is operatively connected to said guide means not only for urging the latter toward said hub when said free end of said guide means is aligned with said slot of said hub but also for positively moving said guide means away from said hub after the film bulge has moved said guide means through a predetermined distance away from said hub.

12. In a camera, in combination, support means for supporting a take-up spool for rotary movement, said take-up spool having a hub formed with a slot through which a leading end of a film strip is adapted to pass to be attached to the spool and wound thereon; film guide means supported by said support means for free turning movement about a predetermined axis to and from a position where a free end of said guide means is aligned with said slot to direct the leading end of a film strip through said slot into said hub, said guide means having an elongated portion distant from said free end thereof and a curved portion extending from said elongated portion to said free end and presenting to a film strip which advances toward said hub a concave surface promoting in the film strip, when the leading end of the film strip encounters in the hub a surface preventing further movement of the film strip into the hub while the film strip continues to advance toward the hub, the formation of a bulge which increases in size during the continued advance of the film strip toward the hub and presses against said guide means to urge the latter to turn away from said hub; directing means carried by said support means for directing the film strip, while it advances toward the hub, along a path which places the film strip first in engagement with said elongated portion of said guide means to slide therealong and then in engagement with said concave surface of said guide means, so that the film strip will bulge between the slot of the hub and the place where it first engages said elongated portion of said guide means; and over-center spring means urging said guide means toward said hub, when said spring means is on one side of a predetermined plane which includes said axis, with a force which is too small to prevent movement of said guide means away from said hub as the bulge in the film strip increases in size and presses with an increasing force against said guide means, said spring means positively moving said guide means away from said hub when said spring means moves through said plane to the other side thereof, the space which is located at that side of said guide means which includes said concave surface being large enough to provide unobstructed formation of the film bulge which urges said guide means in opposition to said spring means away from said hub.

13. In a camera as recited in claim 12, said directing means including a pair of stationary curved walls carried by said support means and defining between themselves part of the path along which the film moves and a pair of film-directing pins respectively located at free ends of said walls which are nearest to said guide means, said pins being respectively located on opposite sides of said plane.

14. In a camera as recited in claim 13, said pins being respectively located at different radial distances from said turning axis so that one of said pins is closer to said turning axis than the other to provide between said pins a passage through which the film can freely advance into engagement with said elongated portion of said guide means.

15. In a camera as recited in claim 13, said walls being connected tangentially to said pins.

References Cited by the Examiner

UNITED STATES PATENTS

| | | | |
|---|---|---|---|
| 1,950,904 | 3/1934 | Opperman | 242—55.11 |
| 2,084,473 | 6/1937 | Becker | 88—17 |
| 2,150,106 | 3/1939 | Roessel | 242—71 X |
| 2,203,655 | 6/1940 | Lechleitner et al. | 88—17 |
| 3,079,055 | 2/1963 | Chevallaz | 226—91 |

MERVIN STEIN, *Primary Examiner.*

EMIL G. ANDERSON, *Examiner.*